(No Model.)
G. P. RUSH.
DRAWER HANDLE.
No. 339,587. Patented Apr. 6, 1886.
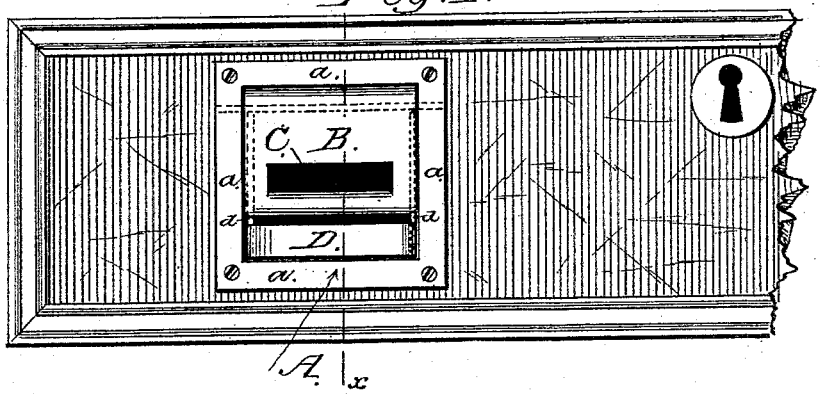
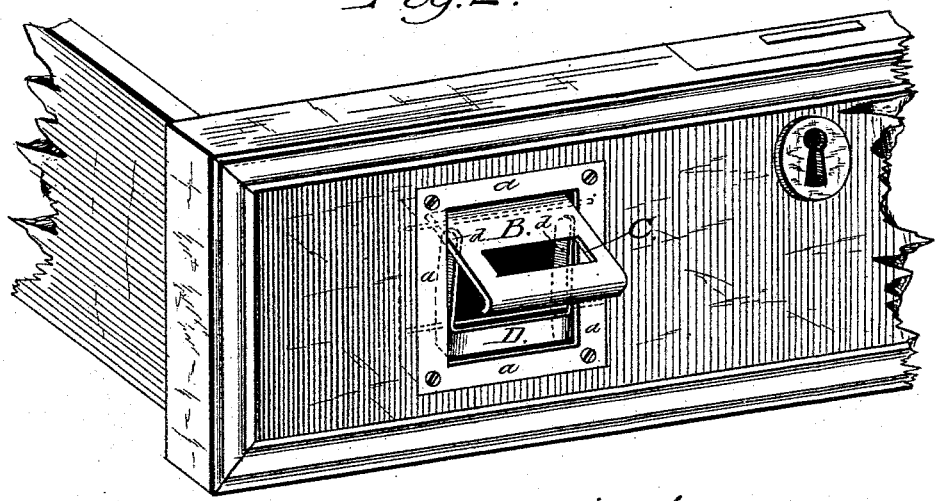
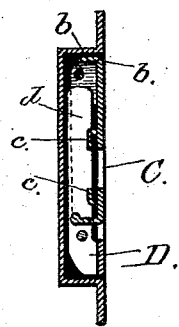
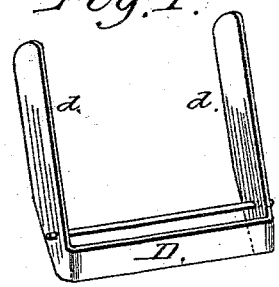
WITNESSES
T. Walter Fowler
H. B. Applewhaite
INVENTOR
George P. Rush
per A. H. Evans & Co
Attorneys

UNITED STATES PATENT OFFICE.

GEORGE P. RUSH, OF MINDEN, NEBRASKA.

DRAWER-HANDLE.

SPECIFICATION forming part of Letters Patent No. 339,587, dated April 6, 1886.

Application filed February 16, 1886. Serial No. 192,065. (No model.)

*To all whom it may concern:*

Be it known that I, GEORGE P. RUSH, a citizen of the United States, residing at Minden, in the county of Kearney, State of Nebraska, have invented a new and useful Improvement in Drawer-Handles, of which the following is a full, clear, and exact description, reference being had to the accompanying drawings, forming part of this specification, in which—

Figure 1 is a front view of the handle closed. Fig. 2 is a perspective view of the handle open and ready for use. Fig. 3 is a vertical section on the line $x\,x$. Fig. 4 is a detached view of the two-armed lever.

My invention relates to that class of handles known as "flush" handles for drawers and other purposes; and it consists in a combination of devices hereinafter described and claimed.

To enable others skilled in the art to make and use my invention, I will proceed to describe the manner in which I have carried it out.

In the drawings, A represents a flanged metal casing, which is to be snugly fitted and secured by mortising into the drawer or other article on which the handle is to be attached, with the flanges $a$ flush with the face of the article.

Within the casing A is pivoted or journaled the handle B, which, when the lower portion is thrown outward, as shown in Fig. 2, furnishes a ready means for operating the drawer, and when not in use hangs flush with the front face of the drawer. The flange $b$ on the upper edge of the handle forms a stop, which, coming in contact with the rear of the casing, determines the extent to which the handle may be thrown outward. The handle may be slotted, as at C, and provided with flanges $c$, adapted to receive cards or labels containing the name of the article contained in the particular drawer, or any other desired inscription. Within the same casing, and below the handle, is pivoted or journaled the lever D, provided with the arms $d$, extending upwardly under the handle B, whereby the handle is thrown out and ready to be taken hold of, as shown in Fig. 2, by simply pressing on the lower edge of the lever D.

It is evident that this handle may be made highly ornamental and adapted to the finest articles of furniture, and in its construction so simple that it is not liable to get out of order.

Having thus described my invention, what I claim as new, and desire to secure by Letters Patent, is—

As an improvement in flush drawer-handles, the casing A and pivoted or journaled handle B, in combination with the pivoted lever D, provided with the arms $d$, all constructed and arranged to operate substantially as and for the purpose described.

GEORGE P. RUSH.

Witnesses:
LEVI M. COPELAND,
FRANK M. TRICH.